United States Patent
Shirouzu

(10) Patent No.: US 7,581,574 B2
(45) Date of Patent: Sep. 1, 2009

(54) VEHICLE TIRE WITH TREAD HAVING AT LEAST THREE ANNULAR REGIONS EACH PROVIDED WITH AXIAL GROOVES

(75) Inventor: Toshimichi Shirouzu, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/313,791

(22) Filed: Dec. 22, 2005

(65) Prior Publication Data
US 2006/0137789 A1 Jun. 29, 2006

(30) Foreign Application Priority Data
Dec. 24, 2004 (JP) ............... 2004-373976

(51) Int. Cl.
*B60C 11/03* (2006.01)
(52) U.S. Cl. ............. 152/209.2; 152/209.3; 152/209.8; 152/209.9
(58) Field of Classification Search .............. 152/209.2, 152/209.3, 209.8, 209.9, 209.18
See application file for complete search history.

(56) References Cited

U.S. PATENT DOCUMENTS 4,474,223 A * 10/1984 Landers ................... 152/209.2
5,964,266 A * 10/1999 Boiocchi et al. ......... 152/209.2
6,105,644 A * 8/2000 Ikeda ....................... 152/209.8
6,439,286 B1 * 8/2002 Baumhofer et al. ...... 152/209.8
2004/0118494 A1* 6/2004 Liederer ................... 152/209.3

FOREIGN PATENT DOCUMENTS

| EP | 114594 | * | 4/1989 |
| GB | 2376217 | * | 12/2002 |
| JP | 63-159110 | * | 7/1988 |
| JP | 03-025006 | * | 2/1991 |
| JP | 04-193607 | * | 7/1992 |
| JP | 06-239110 | * | 8/1994 |
| JP | 2805472 B2 | | 7/1998 |
| JP | 11-028911 | * | 2/1999 |

* cited by examiner

*Primary Examiner*—Steven D Maki
(74) *Attorney, Agent, or Firm*—Birch, Stewart, Kolasch & Birch, LLP

(57) ABSTRACT

A pneumatic tire comprises a tread portion provided with annular regions each provided with axial grooves each extending from one of the axial edges of the annular region, wherein each axial groove is defined as having a groove width of from 2.0 to 6.0 mm and an axial length of not less than 40% of the axial width of the annular region. The annular regions are different from each other with respect to the number Nj of the axial grooves therein, and the greatest common divisor of the different numbers Nj of the grooved annular regions is in a range of from 10 to 40.

13 Claims, 2 Drawing Sheets

VEHICLE TIRE WITH TREAD HAVING AT LEAST THREE ANNULAR REGIONS EACH PROVIDED WITH AXIAL GROOVES

The present invention relates to a vehicle tire, more particularly to a tread pattern capable of improving noise performance.

Automobile noise is mainly a combination of tire noise and mechanical noise from the engine, transmission and the like.

Recent years, the mechanical noise is remarkably reduced. Especially, in the case of a hybrid car and battery car, when running with electric motors, the mechanical noise becomes almost zero. Under the circumstances, tire manufacturers are strongly required to make pneumatic tires generating less noise.

Hitherto, as well known in the tread design art, so called variable pinching methods have almost always been used as effective means for reducing a type of tire noise. In the variable pinching methods, periodicity of circumferentially repeatedly arranged tread elements is reduced so as not to cause remarkable peaks in the noise sound spectrum, or not to rise the sound pressure level at a specific frequency.

On the other hand, the Japanese patent 2805472 (publn. No. 63-159110) discloses a tire whose a tread portion is divided into blocks arranged in a plurality of circumferential rows, wherein in order to reduce noise, the number of axial grooves is varied between the rows, and the number of the blocks in a row is increased from the outside to the inside of a vehicle.

In order to further reduce tire noise, the present inventor studied and found that: even if tires are constructed according to a variable pinching method or the above prior art, synchronization of impulsive sound generations occurs with a high probability and this worsen the noise. The impulsive sound generations are from the grooves or tread elements which are positioned at axially different positions but circumferentially almost same positions. For example, so called pumping noise heard when the air in a groove is jetted out due to the groove volume change during running, and a ground contacting sound heard when an axially extending edge of a tread element such as block comes into contact with the ground surface during running are given as the impulsive sound. Further, even if the axial grooves are inclined, it is difficult to forecast when the noise sound from one axial groove reaches to its maximum sound level. Thus, it is very difficult to determine whether the synchronization occurs or not from the comparison of the specific positions (for example ends) of the grooves.

The inventor therefore, further studied to reduce or avoid the synchronization of impulsive sound generations and discovered a method which is effective even when used alone and more effective when used in combination with a variable pitching method, provably any variable pitching method or prior art.

It is therefore, an object of the present invention to provide a pneumatic tire, in which noise performance is effectively improved.

According to the present invention, a pneumatic tire comprises a tread portion provided with at least two annular regions each provided with axial grooves each extending from one of the edges of the annular region, wherein each of the axial grooves is defined as having a groove width of from 2.0 to 6.0 mm and an axial length of not less than 40% of the axial width of the annular region, the above-mentioned at least two annular regions are different from each other with respect to the number Nj of the axial grooves disposed therein, and the greatest common divisor of the different numbers Nj of the at least two grooved annular regions is in a range of from 10 to 40.

In this application, the term "groove width" means a width measured perpendicularly to the longitudinal direction of the groove or to the center line of the groove.

An embodiment of the present invention will now be described in detail in conjunction with the accompanying drawings.

In this embodiment, vehicle tire 1 according to the present invention is a pneumatic radial tire for passenger cars. As well know in the art, a pneumatic tire comprises a tread portion, a pair of axially spaced bead portions and a pair of sidewall portions extending between the tread edges and bead portions.

Figure 1:
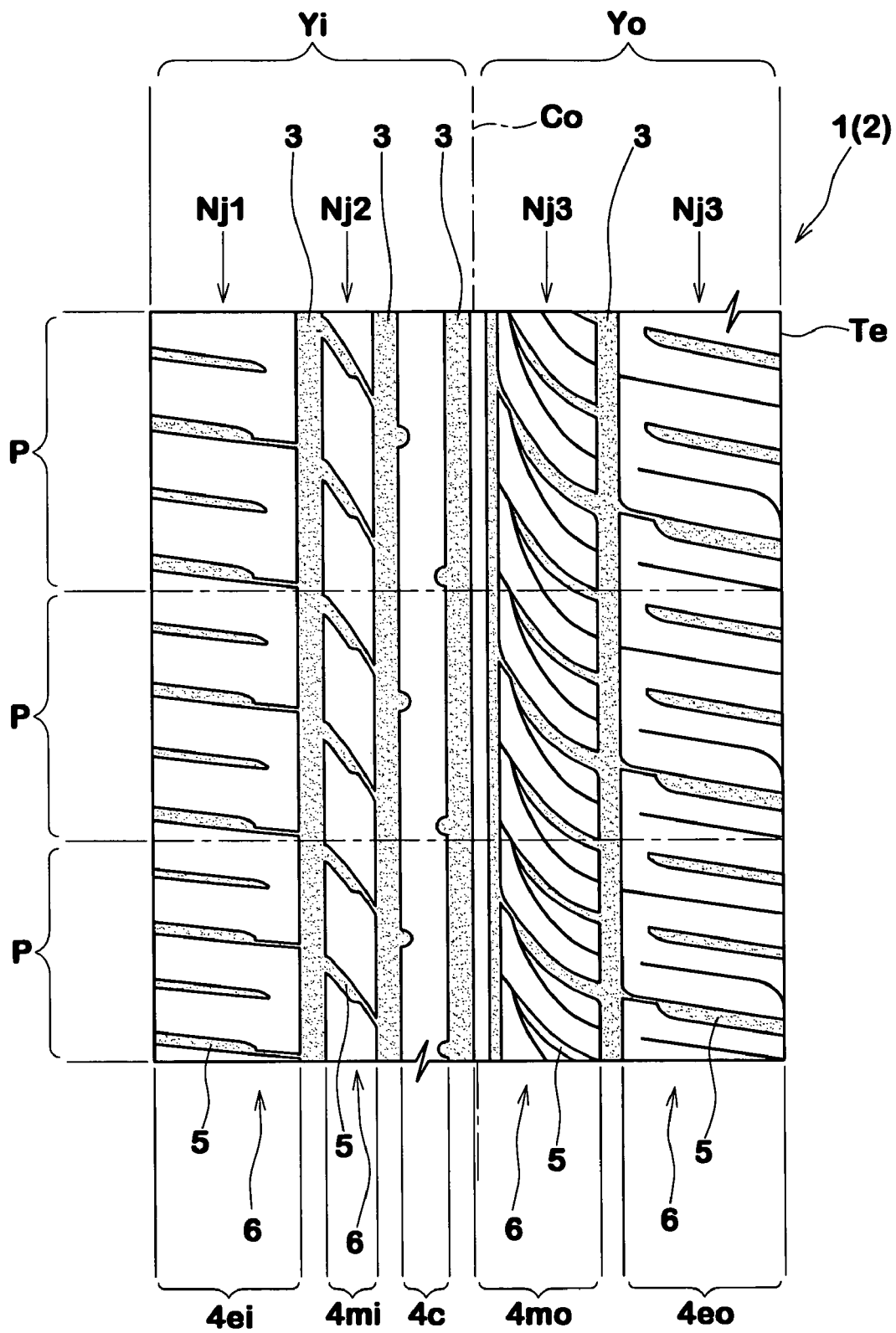
FIG. 1 is a partial developed plan view of a pneumatic tire showing a tread pattern according to the present invention.

The tread portion 2 is provided with tread grooves and optionally sipes defining a tread pattern. FIG. 1 shows an example of the tread pattern suitable for minivans aiming at low noise and steering stability.

The tread grooves include a plurality of main grooves 3 extending continuously in the tire circumferential direction, whereby the tread portion 2 is axially divided into at least three annular regions 4.

Here, the circumferential main groove 3 is a groove having a groove width of not less than 2.0 mm provided for drainage purpose. Thus, a narrow groove of less than 2.0 mm in groove width is not included in the main groove 3. Further, a part having a groove width of less than 2 mm is not regarded as a part of the main groove.

As the main grooves 3, straight grooves are used in this embodiment in view of drainage and noise. But, a zigzag groove made up of linear segments or a smoothly curved zigzag groove may be used as well. Even in the case of zigzag grooves, however, it is preferable that the zigzag amplitude is as small as possible.

In this example, four main grooves 3 are disposed in the tread portion 2. Accordingly, the tread portion 2 is divided into five annular regions 4: axial outermost two regions 4e along the tread edges Te; axial inner two regions 4m; and a central region 4c therebetween.

At least two of the annular regions 4, in this example four of five regions, 4m and 4e, are each provided with axial grooves 5 (hereinafter, the "grooved annular region").

In this invention, in order to preclude grooves which have less or no effect on the pumping noise and thus to maximize the effect to reduce the pumping noise, the axial groove 5 is defined as having a groove width Wg of from 2.0 to 6.0 mm and an axial length F of not less than 40% of the axial width Wr of the annular region on which the groove is provided. Accordingly, a groove having a groove width outside the above range is not regarded as the axial groove 5. Also a part having a groove width outside the above range is not regarded as a part of the axial groove 5. A groove or a part having an axial length shorter than 40% is not regarded as the axial groove 5 even if it has a groove width within the above range.

Further, the term "narrow groove" means a groove having a groove width of less than 2 mm or a sipe.

The tread pattern in this example is a unidirectional pattern which is neither line symmetric nor point symmetric. A half of the tread portion 2 on one side of the tire equator Co and another half on the other side are provided with different patterns.

Giving that a half of the tread portion to be placed on the outside of the vehicle is named "outboard tread half Yo", and another tread half to be placed on the inside of the vehicle is named "inboard tread half Yi", the above-mentioned central annular region 4c is shifted towards the inboard tread half Yi. Preferably, the central annular region 4c is completely within the inboard tread half Yi.

According to need, the outermost and inner annular region 4e and 4m in the inboard tread half Yi are indicated as 4ei and 4m using a suffix "i", and those in the outboard tread half Yo are indicated as 4eo and 4mo using a suffix "o".

In each of the grooved annular regions 4, the axial grooves 5 each extend from one edge toward the other edge of the region.

The axial grooves 5 may be extended across the overall width of the annular region, but in this embodiment, in view of noise reduction, the axial grooves 5 do not extend across the overall width of the annular region in the sense of the above-mentioned definition by the groove width limitation. However, as described below, if narrow groove parts outside the above range are included, they are appeared as extending across the overall width.

In the inboard axial-outer annular region 4ei, there are disposed axial grooves 5ei inclined at an angle theta1 of not more than 15 degrees with respect to the tire axial direction. The axial grooves 5ei include: semi-open axial grooves 5ei1 each extending from the axially outer edge of the region 4ei and terminating within the region 4ei to have a closed axial inner end; and open axial grooves 5ei2 extending in parallel with the semi-open axial grooves 5ei1 from the axially outer edge of the region 4ei to have almost same lengths as those of the semi-open axial grooves 5ei1 and each provided with a narrow extension (narrow groove or sipe) reaching to the axially inside edge of the region 4ei.

In the inboard axial-inner annular region 4mi, open axial grooves 5mi2 extending from the axially outer edge of the region 4mi at an angle theta2 large than the above-mentioned angle theta1 and provided at the axially inner end with a narrow extension (narrow groove or sipe) reaching to the axially inside edge of the region 4mi.

In the outboard axial-outer annular region 4eo, there are disposed axial grooves 5eo inclined at an angle theta3 of not more than 15 degrees with respect to the tire axial direction. The axial grooves 5eo include: semi-open axial grooves 5eo1 each extending from the axially outer edge of the region 4eo and terminating within the region 4eo to have a closed axial inner end; and open axial grooves 5eo2 extending in parallel with the semi-open axial grooves 5eo1 from the axially outer edge of the region 4eo to have almost same lengths as those of the semi-open axial grooves 5eo1 and each provided with a narrow extension (narrow groove or sipe) reaching to the axially inside edge of the region 4eo. Between the axial grooves 5eo, narrow grooves 7eo substantially parallel to the axial grooves 5eo are disposed.

The outboard axial-inner annular region 4mo is provided near the axially inner edge thereof with a circumferentially extending narrow straight groove 8mo. In this region 4mo, further, on the axially outside of the narrow groove 8mo, there are disposed arced axial grooves 5mo inclined at an angle theta4 of more than the angle theta3. The axial grooves 5mo include: two kinds of semi-open axial grooves 5mo2 extending from the axially outer edge of the region 4mo to near the narrow groove 8mo, and each provided at the axially inner end with a narrow extension (narrow groove or sipe) reaching to the narrow groove 8mo. Between the axial grooves 5mo, there are disposed arced narrow grooves 7mo extending from the axially inner ends of the axial grooves 5mo to the axially outer edge of the region 4mo.

The central annular region 4c is not provided with the axial groove 5. In this example, however, notches 9 having a length of less than 40% of the axial width of the region 4c are staggeredly formed at the edges of the region 4c.

In this embodiment, therefore, the annular region 4c forms a rib extending continuously in the tire circumferential direction, and the remaining annular regions 4ei, 4mi, 4mo and 4eo form four riblike tread elements 6. Here, the term "riblike" means that the overall width of the annular region is not crossed by a groove having a groove width of 2.0 mm or more.

As to the number Nj of the axial grooves 5 in each of the grooved annular regions 4, the regions 4 hve at least two, preferably at least three different numbers Nj. In this example, four grooved annular regions 4ei, 4mi, 4mo and 4eo have three different numbers Njk (k is suffix, in this example 1, 2 and 3). More specifically, the region 4ei has a number Nj1, the region 4mi has a number Nj2 and the regions 4mo and 4eo have a number Nj3.

According to the invention, the greatest common divisor GCD of the above-mentioned at least two different numbers Nj is set in a range of not less than 10 preferably not less than 12, but not more than 40 preferably not more than 30.

As shown in FIG. 1, the tread pattern is formed by circumferentially repeatedly arranging a pattern unit P with changing the circumferential pitch length PL of the pattern unit P according to the predetermined sequence. In other words, a number M of pattern units P having a number L (L=<M) of different circumferential pitch lengths PL are arranged around the tire in a sequence determined according to one of variable pitch methods including known methods. The object to which the variable pitch method is applied is the pattern unit P which covers from one of the tread edges to the other tread edge Te, not an individual tread element or groove.

Figure 2:
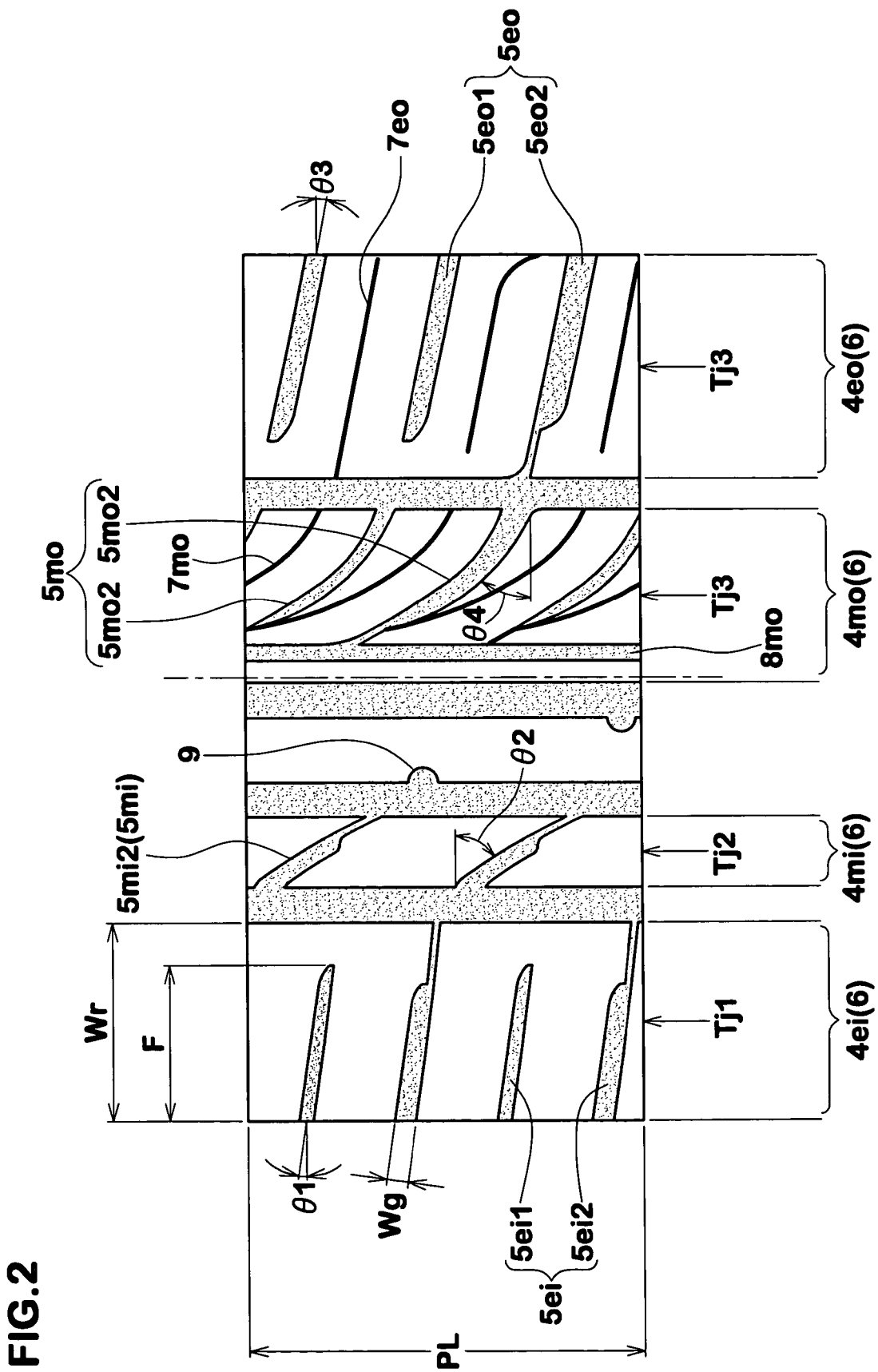
FIG. 2 is an enlarged view showing a basic pattern unit thereof.

Within each pattern unit P, the number Tj of the axial groove(s) 5 in each annular region is varied between the annular regions having the different numbers Nj. For example, in FIG. 2, the number Tj1 in the region 4ei is 4, the number Tj2 in the region 4mi is 2, and the number Tj3 in the region 4mo or 4eo is 3. As a result it is relatively easy to avoid the synchronization of impulsive sound generations because the number of axial grooves the designer has to take account is considerably small.

As the pattern unit P is repeated around the tire the number M times, the above mentioned total axial groove numbers Nj1, Nj2 and Nj3 are: Nj1=Tj1×M; Nj2=Tj2×M; and Nj3=Tj3×M. In this example, as the greatest common divisor of Tj1, Tj2 and Tj3 is 1, the above-mentioned greatest common divisor GCD of Nj1, Nj2 and Nj3 is equal to the number M. Accordingly, the tread pattern in this example is formed by circumferentially repeating a pattern unit P the number GCD times (namely 10-40 times).

Like this, if the greatest common divisor of the numbers Tj of the axial grooves in the annular regions is 1, the tread pattern is formed by repeating a pattern unit P the number GCD times regardless whether a variable pitch method is used or not.

As explained above, the number of the different numbers Njk (k is suffix number) provided on the grooved annular regions 4 (namely, maximum suffix number kmax) is at least two, preferably at least three in this embodiment.

In view of noise performance, it is especially preferable that the number of the different numbers Njk is equal to the number (A) of the grooved annular regions 4 or a number (A-1). In this embodiment, thus, four or three is preferable.

Aside from this embodiment, it is preferable that the number (kmax) of the different numbers Njk is at most five, because it becomes difficult for some of the annular regions 4 to maintain a necessary rigidity.

If the greatest common divisor GCD is less than 10, as the number M of repetition of the pattern unit P becomes small, it becomes difficult to apply a variable pitching method. If the greatest common divisor GCD is more than 40, it becomes difficult for a region in which the axial groove number Tj becomes largest to maintain the necessary rigidity. Thus, the steering stability, uneven wear resistance and the like are liable to deteriorate.

As explained above, it is preferable that the axial grooves 5 provided on the grooved annular regions 4 include two kinds of grooves, namely, the open-type groove of which both ends are opened at the opposite edges of the annular region, and the semi-open-type groove of which one end is opened and the other end is completely terminated within the region.

This is because the pumping sound from the open-type groove and that from the semi-open-type groove are different from each other with respect to the noise frequency spectrum, and by arranging these two types of grooves in one annular region it becomes possible to improve the noise frequency spectrum.

Therefore, in the inboard axial-outer annular region 4ei, the semi-open-type grooves 5ei1 and open-type grooves 5ei2 are alternately arranged in the following order: semi-open, open, semi-open, open, repeat. In the outboard axial-outer annular region 4eo, the semi-open-type grooves 5eo1 and open-type grooves 5eo2 are alternately arranged in the following order: semi-open, semi-open, open, repeat.

It is preferable that the percentage of the number of the semi-open-type grooves to the axial groove number Nj in each region is increased in the outboard tread half Yo when compared with the inboard tread half Yi because it is desirable for the steering stability and uneven wear resistance to have the rigidity of the outboard tread half Yo higher than the inboard tread half Yi. Thus, the arrangement of the semi-open and open type grooves is differed between the corresponding annular regions 4eo and 4ei as described above.

Further, for the same reason, it is preferable that the land area ratio Lo (%) of the outboard tread half Yo is larger than the land area ratio Li (%) of the inboard tread half Yi, and the difference (Lo%–Li%) is set in a range of from 5 to 15. Here, the land area ratio L/S is a ratio of the actual ground contacting area L to the gross area S.

If the difference Lo–Li is less than 5, it becomes difficult to improve the steering stability, uneven wear resistance and the like. If the difference Lo–Li is more than 15, the drainage is off-balanced and wet grip performance is liable to deteriorate.

In view of dry grip and wet grip performance, it is more preferable that the land area ratio Lo of the outboard tread half Yo is set in a range of from 65 to 75%, and the land area ratio Li of the inboard tread half Yi is set in a range of from 60 to 70%.

Comparison Tests:

Radial tire of size 215/60R16 (rim size 16×6.5JJ) for minivans having the same structure except for the tread patterns were made by partly modifying the tread pattern shown in FIG. 1 and tested for noise performance.

The specifications of the tread patterns and test results are shown in Table 1.

Noise Performance Test:

Using a Japanese 3000cc FF minivan provided on all the four wheels with test tires (pressure 230 kPa), noise sound level was measured in the front seat thereof during running on an asphalt paved straight tire test course at running speeds of 40, 60, 80 and 100 km/h.

TABLE 1

| Tire | Ref. 1 | Ex. 1 | Ex. 2 |
|---|---|---|---|
| Land area ratio Lo (%) | 68 | 73 | 68 |
| Land area ratio Li (%) | 68 | 63 | 68 |
| Number of Annular regions | 5 | 5 | 5 |
| Number of Grooved regions | 4 | 4 | 4 |
| Number Nj of axial grooves in each region | | | |
| Inboard axial-outer region (4 ei) | 116 | 116 | 110 |
| Inboard axial-inner region (4 mi) | 58 | 58 | 60 |
| Center annular region (4 c) | 0 | 0 | 0 |
| Outboard axial-inner region (4 mo) | 58 | 87 | 90 |
| Outboard axial-outer region (4 eo) | 58 | 87 | 90 |
| Number (kmax) of Different numbers Nj | 2 | 3 | 3 |
| Greatest common divisor GCD | 58 | 29 | 10 |
| Pattern unit | | | |
| Number M of repetition | 58 | 58 | 20 |
| Number of different pitch lengths PL | 5 | 5 | 5 |
| Number of annular regions provided with both of open and semi-open grooves | 4 | 4 | 4 |
| Noise performance (dB) | | | |
| 40 km/h | 52.9 | 51.3 | 51.6 |
| 60 km/h | 56.7 | 55.1 | 55.7 |
| 80 km/h | 61.3 | 59.8 | 60.4 |
| 100 km/h | 66.0 | 65.2 | 65.7 |

The invention claimed is:

1. A pneumatic tire comprising a tread portion having a tread width and provided with at least two circumferentially continuously extending main grooves to axially divide the tread portion into at least three annular regions each provided with axial grooves each extending from one of the axial edges of the annular region, wherein each said axial groove is defined as having a groove width of from 2.0 to 6.0 mm and an axial length of not less than 40% of the axial width of the annular region, said at least three annular regions are different from each other with respect to the number Nj of the axial grooves therein, and the greatest common divisor of the different numbers Nj of said at least three grooved annular regions is in a range of from 10 to 40, and wherein the tread portion is provided with a tread pattern formed by circumferentially repeating a pattern unit a number M times, the pattern unit extends across the entire tread width and includes some of the axial grooves in said at least three annular regions, and within the pattern unit, the number Tj of the axial groove or grooves in each of the annular regions is varied between the annular regions having the different numbers Nj, and said number M is equal to said greatest common divisor.

2. The pneumatic tire according to claim 1, wherein the tread portion is provided with four grooved annular regions.

3. The pneumatic tire according to claim 1, wherein the tread portion is provided with five grooved annular regions.

4. The pneumatic tire according to claim 1, 2 or 3, wherein the tread portion is further provided with a rib, which is a non-grooved annular region provided with none of the axial grooves.

5. The pneumatic tire according to claim 1, 2 or 3, wherein the tread portion is further provided with a grooved annular region which is provided with the axial grooves the number Nj of which is equal to the number Nj of one of said at least three grooved annular regions.

6. The pneumatic tire according to claim 1, wherein the axial grooves disposed in at least one of the grooved annular regions include open grooves and semi-open grooves.

7. The pneumatic tire according to claim 1, wherein a land area ratio Lo of an outboard tread half which is a half of the tread portion on one side of the tire equator is larger than a land area ratio Li of an inboard tread half which is another half of the tread portion on the other side of the tire equator.

8. The pneumatic tire according to claim 1, wherein
the tread portion is provided with four straight main grooves extending circumferentially of the tire so as to divide the tread portion into five axial parts, wherein
four of the five axial parts are said annular regions provided with the axial grooves, and
one of the five axial parts is a rib provided with none of the axial grooves,
the rib is disposed within one half of the tread portion on one side of the tire equator, and
said one half is provided on the axially outside the rib with two of the four annular regions.

9. The pneumatic tire according to claim 8, wherein the land area ratio in % of said one half is smaller than the land area ratio in % of the other one half of the tread portion, and the numerical difference between the two ratios in % is 5 to 15.

10. The pneumatic tire according to claim 1, wherein the circumferential pitch length of the pattern units varies about the circumference of the tire.

11. The pneumatic tire according to claim 1 or 10, wherein, within the pattern unit, the circumferential position of each segment of said at least three annular regions is the same.

12. The pneumatic tire according to claim 1 or 10, wherein, within the pattern unit, each segment of said at least three annular regions is provided with more than one axial groove.

13. The pneumatic tire according to claim 10, wherein, within the pattern unit:
the circumferential position of each segment of said at least three annular regions is the same
each segment of said at least three annular regions is provided with more than one axial groove.

* * * * *